March 26, 1935. J. A. GRAY 1,995,610

LOCK NUT, BOLT, AND RIVET

Filed Sept. 3, 1930

Inventor:
Joseph A. Gray.

Patented Mar. 26, 1935

1,995,610

UNITED STATES PATENT OFFICE 1,995,610

LOCK NUT, BOLT, AND RIVET

Joseph A. Gray, Norwalk, Conn.

Application September 3, 1930, Serial No. 479,455

2 Claims. (Cl. 85—1)

My invention relates to lock nut bolts and screws and rivets clinched by pressure and noiseless for use in steel construction in buildings, ships, bridges and engines of all kinds; also it may be used in heavy wood construction, railroad track construction, automobiles, and all other uses where heavy steel rivets, machine screws and threaded bolts with nuts, of the present make, are now used; and where the union of parts must be powerful and immovably rigid, as one piece. One object of this invention is to provide a solid fastening, by bolting, screwing and riveting the parts together, as enumerated; the object being attended with little, or no noise, at the same time the bolts and screws are locked with ease and dispatch, and the riveting is powerful, rigid and noiseless, and secure against casual loosening. Further objects of this invention, that may not be obvious, are to provide a bolt of this character, which is used to lock the nut, and as a strong noiseless rivet in steel construction, and a machine screw locked, when the threaded screw end cannot be reached, other than to effect its safety by an end spread by pressure, all of maximum strength and reasonably cheap.

The invention comprises the improved bolt, nut, rivet and devised tool, and describes several modified forms and uses.

Figure 1:
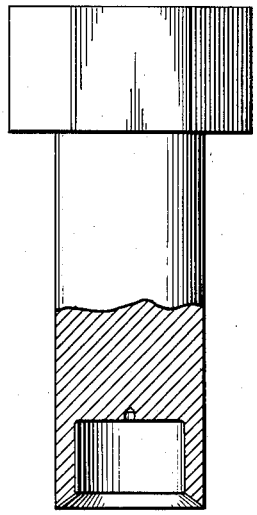
Figure 2:
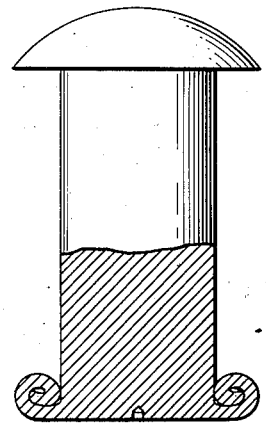
Figure 3:
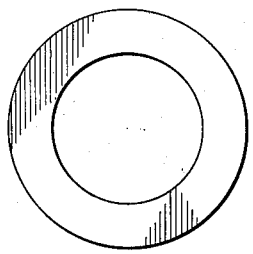
Figure 4:
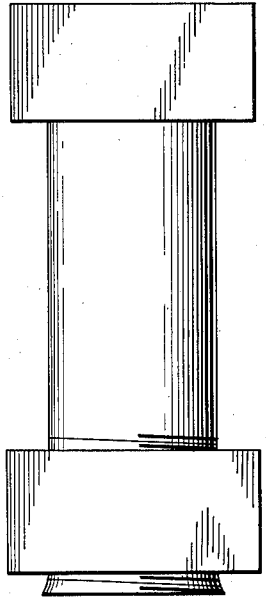
Figure 5:

In the drawing, Fig. 1 is a vertical sectional view of the bolt, as prepared for a rivet; Fig. 2 is a vertical sectional view, of one form of the bolt, showing the manner of the clinch in part and the mitered rim edge prepared for a riveting clinch as it is countersunk; Fig. 3 is a perpendicular view of a plain metal washer used in riveting; Fig. 4 is a view of a threaded bolt and nut countersunk, mitered and locked together; Fig. 5 is a lateral central sectional view of a countersunk nut, as threaded and locked upon the threaded bolt in Fig. 4.

The invention is clearly shown by the several numbered drawings, and can be clearly seen, and understood without further encumbering the record.

The rivet shown in the drawing consists of a headed shaft drilled, mitered and countersunk, leaving a thin walled, cup shaped, shallow cavity; Fig. 1 the rim and edge of the wall are mitered, as outlined in Fig. 2 which facilitates and makes certain the coiled clinch of the walls of the cavity, by rolling it outward then inward in circles, in forming the powerful riveting coiled clinch, when only the end of the rivet is exposed, surrounded with the rolled coiled riveting on a level with its surface, giving the riveted end a flat surface, with the rounded edge of the coiled clinch. This result is not attainable with blows of the hammer directly upon the prepared rivet end, and would not be the powerful coiled clinch and rivet made with this improvement, and necessary for the work and use this improvement is made for, holding the resistance it is designed to hold, which resistance will tend to tighten rather than weaken the coil clinched rivet; this clinch, it will be seen, distributes the pressure evenly over a considerable surface of the riveted members, equal to the strength of the clinch. It will be seen the heavier the wall of the counter-sink and mitered cavity, the stronger and more powerful will be the coiled riveting clinch. Riveting spreading and clinching can only be effected by use of a punch, which is especially made and fitted for that use, and may be used with pressure noiselessly, and by blows of a hammer upon it, sufficient to coil and tighten the clinch, when continued pressure forces the end inward and around until the limit of the coil is reached, and the powerful clinch is made. The mitered rim of the countersunk cavity presses against the riveted members, and with the shape of the punch end and the pressure cause it to continue on inward and complete the clinch. The hole in the nut is slightly countersunk, spreading outward at the outer surface, as used in Fig. 4, this spreading surface is threaded, following the interior of the nut, Fig. 5, and with the use of the punch, the thread on the bolt is spread into and meshes with the thread upon the countersunk surface of the threaded nut having a continuity of thread; the hold of the threaded nut is thus strengthened and prevents stripping, the threaded nut being locked securely on, and can only be removed with a strong wrench; when the nut should not be removed directly, but should be passed back and forth a number of times over the continuity of thread on the spread of the bolt, to return it to its normal size, so the nut can be threaded on again; this may be repeated a number of times, and safely locked each time. The common nut may be threaded onto this bolt, and the cup end of the bolt locked by spreading with the punch. It is obvious the shaft of both the threaded bolt and the rivet may be tubular throughout, and the threaded bolt may be threaded and prepared to lock the nut on both ends, in either a solid or a tubular shaft; and the rivet may be prepared and riveted on both ends, in a solid or tubular shaft.

What I claim is:—

1. A riveted joint in which the rivet has a solid or tubular shaft with a recess of uniform circumference and a wall of any desired thickness, the recess being mitered outwardly at the rim to an annular edge, the wall being of uniform thickness and rolled inwardly evenly over the surface of the riveted members so as to extend beyond the periphery of the shaft and rounded off even with its end, to hold the riveted members together rigidly and immovably.

2. A bolt with a thin walled shallow cup formed at the threaded end to place any nut thereon, it being curvedly countersunk and having continuity of thread at the outer end of the orifice, to permit the cup to be curvedly circumferentially spread slightly beyond the surface of the nut with unbroken thread, thereby locking the nut thereon.

JOSEPH A. GRAY.